Feb. 7, 1961 L. R. BUSBY ET AL 2,970,804
TAPS, COCKS AND THE LIKE
Filed July 31, 1957 2 Sheets-Sheet 1
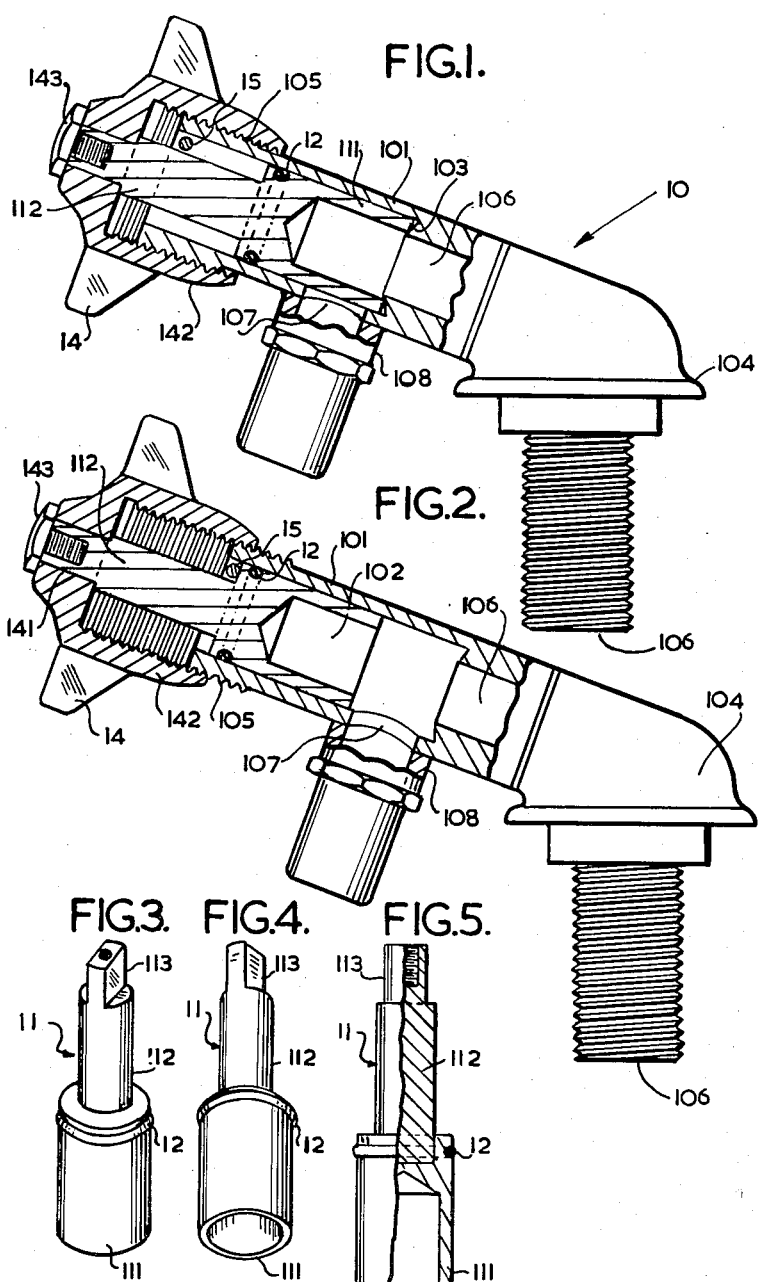
INVENTORS
LESLIE R. BUSBY
DESMOND G. H. KING
BY
Kenway, Jenney, Witter & Hildreth
ATTORNEYS Feb. 7, 1961   L. R. BUSBY ET AL   2,970,804
TAPS, COCKS AND THE LIKE
Filed July 31, 1957   2 Sheets-Sheet 2
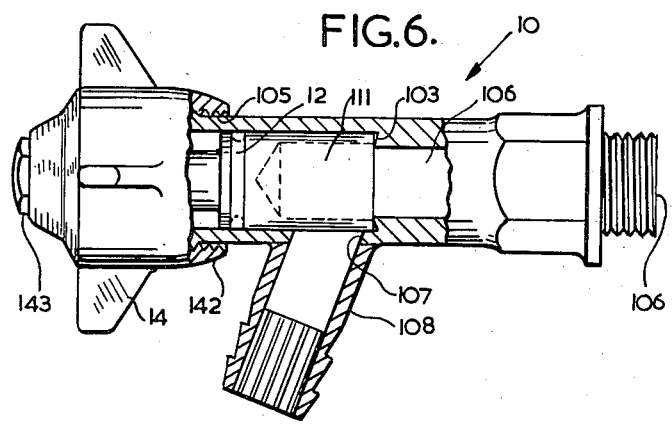
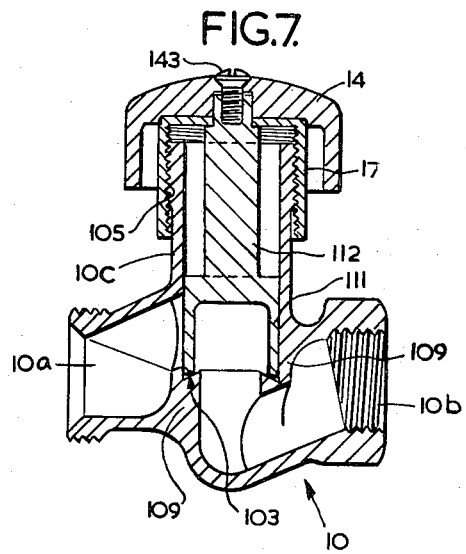
INVENTORS
LESLIE R. BUSBY
DESMOND G. H. KING
BY
ATTORNEYS `United States Patent Office`

2,970,804
Patented Feb. 7, 1961

2,970,804

TAPS, COCKS AND THE LIKE

Leslie Roy Busby, Erdington, Birmingham, and Desmond George Henry King, Birmingham, England, assignors to Charles Elliott Tapscott Cridland and Edward Albert Corbett, Birmingham, England Filed July 31, 1957, Ser. No. 675,351

Claims priority, application Great Britain Apr. 30, 1957

5 Claims. (Cl. 251—175)

This invention has reference to improvements relating to taps, cocks, and the like and has for its object to provide improved taps, cocks and the like which are simple in construction, efficient in operation and capable of being produced at a relatively low cost.

Accordingly, the invention consists of a tap, cock or the like which is characterized in that the fluid flow control element is in the form of a positively actuable sleeve or block of a resilient and deformable plastic material which is axially displaceable for opening and closing purposes within a bore having communication with the fluid inlet and with the fluid outlet and which is susceptible at all times to such pressure as may obtain on the inlet side of the said sleeve or block and which in the closed position covers completely the fluid outlet.

The invention also consists of an improved tap, cock or the like which is characterised in that the displaceable fluid flow control element is in the form of a sleeve or block of a resilient and deformable plastic material which is axially displaceable for opening and closing purposes with a bore having communication with the fluid inlet and with the fluid outlet and which is susceptible at all times to such pressure as may obtain on the inlet side of the said sleeve or block and which when the degree of pressure of the liquid the flow of which to be controlled by the tap, cock or the like is sufficiently high, is deformable under the influence of the pressure of the liquid on the inlet side into sealing contact with the contacting surface of the bore within which it is displaceable and which in the closed position covers completely the fluid outlet.

The invention also resides in a tap, cock or the like constructed and adapted for use substantially as will be described hereinafter.

Embodiments of the invention will now be described with particular reference to the accompanying drawings wherein:

Figure 1 is a view partly in section and partly in elevation illustrating the invention as applied to a pillar tap for use with domestic water supply systems and showing the fluid flow control element in the fully closed position, Figure 2 is a similar view to Figure 1 but showing the fluid flow control element in the fully open position.

Figure 3 is a perspective view seen from above of the fluid flow control element employed in the pillar tap illustrated in Figures 1 and 2, Figure 4 is a perspective view seen from below of the fluid flow control element illustrated in Figure 3, Figure 5 is a view partly in front elevation and partly in section of an alternative construction of the fluid flow control element, Figure 6 is a view partly in elevation and partly in section illustrating the invention as applied to a tap for domestic wash boilers, and Figure 7 is a view partly in elevation and partly in section illustrating the invention as applied to a regulator valve for a radiator of a hot water heating installation.

In the drawings where appropriate like numerals of reference are indicated to denote similar or analogous parts in the several views.

Referring first to the embodiment of the invention illustrated in Figures 1 and 2:

According to the said embodiment of the invention the body of the pillar tap which is denoted generically by the reference numeral 10, incorporates a forwardly projecting section 101 having a bore 102 of uniform diameter, an inner intermediate annular frusto-conical seating 103 and a fixing section 104, said section 101 being screw threaded externally at the outer end denoted by the reference numeral 105.

The bore 102 has communication by way of the passage in the annular seating 103 with the fluid inlet 106 and by way of the port 107 with the inclined outlet spout 108.

Displaceably mounted within the bore 102 is a fluid flow control element, denoted generically by the reference numeral 11, said fluid flow control element 11 incorporating a hollow cylindrical sleeve section 111 and an outwardly projecting stem 112.

The fluid flow control element 11 is made from a resilient and deformable but relatively rigid synthetic material conveniently the material known as nylon and may be moulded in one piece as depicted in Figures 2 and 4 or said element may be of a composite construction as illustrated in Figure 5, in which case the sleeve section 111 is formed of nylon and the stem 112 of metal.

The sleeve section 111 aforesaid is provided adjacent to the top with an annular groove within which is located an O-section packing ring 12 of known type. The section 111 is a continuous cylinder and is unbroken by any transverse or lateral port, a characteristic that has been found advantageous where nylon or similar plastic material is employed.

At the top the stem 112 is stepped as at 113 to provide a spigot of elongated formation which is adapted to be engaged within an elongated slot 141 of complementary shape formed in the centre of a capstan head 14, said capstan head 14 being provided with a sleeve section 142 which is threaded internally for engagement with the screw threaded section 105 of the body 10.

The capstan head 14 is secured to the stem 112 by means of a bolt 143.

The wall of the body 10 is bored for the reception of a stop pin 15 which limits the outward travel permitted to the sleeve section 111 of the fluid flow control element 11.

It will be appreciated that rotation of the capstan head 14 occasions a simultaneous rotation and axial displacement of the sleeve section 111 whereby the said sleeve section 111 is caused to uncover or cover the outlet port 107 dependent upon the initial position of the said sleeve section 111 and the direction of rotation imparted to the capstan head.

When the sleeve section 111 is moved to the fully closed position the rim bounding the hollow interior of the said sleeve section 111 beds on the annular frustoconical seating 103 and provides a positive cut off.

It will be appreciated that the interior of the sleeve section 111 is subject at all times to the pressure on the inlet side of the said sleeve section 111 and it is found as a consequence that in the case of a pillar tap where the sleeve is subject to relatively high pressure as in the case of a pillar tap for controlling the flow of cold water in a domestic water supply system the pressure is found to effect a deformation of the walls bounding the hollow interior of the sleeve section 11 which is sufficient to deform the walls into sealing contact with the presented surface of the bore 102 so that the pillar tap is substantially leak proof both when fully or partially open and when fully closed without necessarily requiring the rim of the sleeve section to bed on the annular seating 103.

Absolute leak proofness past the sleeve section 111 is ensured by the O-ring 12.

Consequently the bottom sealing is not required in the case of a pillar tap for controlling the cold water flow in a domestic water supply system but since it is considered essential in the case of a pillar tap for controlling the hot water supply and since pillar taps for such usages are fitted in pairs it is found convenient for economy in manufacture and in installation to make pillar taps for controlling the cold and hot water supply identically and to provide each with the bottom sealing arrangement. Accordingly, the rim or annular end surface of the sleeve 111 is of sufficient width or thickness to cooperate with the annular seating 103 formed in the body of the valve.

It will be appreciated also that since the fluid flow control element 11 is housed within a bore of uniform diameter a simple boring operation suffices to produce the housing for the said element thus permitting of a reduction in cost compared with pillar taps of conventional design.

Further it will be appreciated that owing to the frusto-conical formation of the annular seating 103 the sleeve section 111 makes a line contact therewith in the fully closed position and this factor in conjunction with the resilience of nylon renders the said section self-bedding.

Moreover it will be appreciated that the low frictional resistance of the nylon metal contacting surfaces admits of an easy opening and closing movement of the sleeve section 111.

In addition the positive actuation of the sleeve section 111 ensures opening and closing taking place with a uniform resistance to the capstan head 14 irrespective of the degree of opening or closing movement effected.

The embodiment of the invention illustrated in Figure 6 which depicts the invention as applied to a tap for a domestic wash boiler is identical in all material respects with the pillar tap illustrated in Figures 1 to 5.

In the embodiment of the invention as illustrated in Figure 7, the body 10 of the radiator valve therein illustrated is provided with inlet and outlet passages 10a and 10b respectively which are in axial alignment but separated by walls 109 which are formed with an annular frusto-conical seating 103 as in the embodiments already described.

The body 10 is provided with a centrally disposed upstanding section 10c having a bore 102 of uniform diameter within which is located a nylon fluid flow control element 11 which is identical in all material respects with the fluid flow control elements 11 employed in the embodiments which have been described.

Since hot water heating systems operate at low pressures bottom sealing is required.

The stem 112 is associated with a sleeve nut 17 and with an operating wheel 14.

The operation of the valve will be self-evident from the description given hereinbefore in the cases of the other embodiments of the invention.

It is to be understood that in the embodiments of the invention illustrated and described herein synthetic plastic materials other than nylon may be used.

Furthermore it is to be understood that the invention is applicable to taps, cocks and the like of types other than those illustrated and described as for example taps, cocks and the like in which displacement of the fluid flow control is effected by associating with the said element a screw threaded stem which engages with a rotatable but nondisplaceable tubular nut associated with a capstan or wheel operating head. In the latter case where a fluid flow control element in accordance with the invention is fitted the said element will be axially displaceable for opening and closing purposes but will not be simultaneously rotatable.

We claim:

1. A tap, cock, valve or the like comprising a body having a cylindrical bore of uniform diameter which has communication both with a fluid inlet and with a fluid outlet, a fluid flow control element of resilient and deformable plastic material incorporating a hollow unported cylindrical sleeve section which is in constant facial contact with the wall of said bore and axially displaceable therein, the hollow interior thereof being open at all times through an end to the fluid inlet so that in the case where a tap, cock, valve or the like is used with a high pressure supply the plastic wall of the hollowed portion of the said sleeve section is deformed into sealing contact with the wall of the bore, a frusto-conical seating comprising a stationary part of the valve body and located at the inner end of said bore and integral with the body on to which the rim bounding the open end aforesaid seats by axial compression and acts to provide a positive cut off when the said fluid flow element occupies the fully closed position, and means for effecting the positive actuation of the fluid flow control element for opening and closing purposes as required.

2. A tap, cock, valve or the like comprising a body having a cylindrical bore of uniform diameter which has communication both with a fluid inlet and with a fluid outlet, a fluid flow control element of resilient and deformable plastic material incorporating a hollow unported cylindrical sleeve section which is in constant facial contact with the wall of said bore and axially displaceable therein, the hollow interior thereof being open at all times through an end to the fluid inlet so that in the case where a tap, cock, valve or the like is used with a high pressure supply the plastic wall of the hollowed portion of the said sleeve section is deformed into sealing contact with the wall of the bore, a fixed annular seating of tapered formation at the inner end of said bore on which the rim bounding the open end aforesaid seats to make a line contact to provide a positive cut off when the said fluid flow control element occupies the fully closed position, and means for effecting the positive actuation of the fluid flow control element for opening and closing purposes as required.

3. A tap, cock, valve or the like comprising a body having a cylindrical bore of uniform diameter which has communication both with a fluid inlet and with a fluid outlet, a fluid flow control element of resilient and deformable plastic material incorporating a hollow unported cylindrical sleeve section which is in constant facial contact with the wall of said bore and axially displaceable therein, the hollow interior thereof being open at all times through an end to the fluid inlet so that in the case where a tap, cock, valve or the like is used with a high pressure supply the plastic wall of the hollowed portion of the said sleeve section is deformed into sealing contact with the wall of the bore, a fixed annular seating at the inner end of said bore on to which the rim bounding the open end aforesaid seats to provide a positive line cut off when the fluid flow control element occupies the fully closed position, a stem which projects outwardly from said sleeve section, and means associated with said stem for effecting the positive actuation of the fluid flow control element for opening and closing purposes as required.

4. A tap, cock, valve or the like comprising a body having a cylindrical bore of uniform diameter which has communication both with a fluid inlet and with a fluid outlet, a fluid flow control element of resilient and deformable plastic material incorporating a hollow unported cylindrical sleeve section which is in constant facial contact with the wall of said bore and axially displaceable therein, the hollow interior thereof being open at all times through an end to the fluid inlet so that in the case where a tap, cock, valve or the like is used with a high pressure supply the plastic wall of the hollowed portion of the said sleeve section is deformed into sealing contact with the wall of the bore, a resilient packing for said sleeve section, a fixed annular seating at the inner end of said bore on to which the rim bounding the open end aforesaid seats to provide a positive cut off when the fluid flow control element occupies the fully closed position, and means for effecting the positive actuation of the fluid flow control element for opening and closing purposes as required.

5. A tap, cock, valve or the like comprising a body having a cylindrical bore of uniform diameter which has communication at the inner end with a fluid inlet and by way of an aperture in the wall thereof with a fluid outlet, a fluid flow control element of resilient and deformable plastic material incorporating a hollow unported cylindrical sleeve section which is in constant facil contact with the wall of said bore and axially displaceable therein, the hollow interior thereof being open at all times through the said open end to the fluid inlet so that in the case where a tap, cock, valve or the like is used with a high pressure supply the plastic wall of the hollowed portion of the said sleeve section is deformed into sealing contact with the wall of the bore, a resilient packing for said sleeve section, a fixed annular seating at the inner end of said bore on to which the rim bounding the open end aforesaid seats to provide a positive cut off when the fluid flow control element occupies the fully closed position, and means for effecting the positive actuation of the fluid flow control element for opening and closing purposes as required.

References Cited in the file of this patent

UNITED STATES PATENTS

| | | |
|---|---|---|
| 329,809 | Buffet | Nov. 3, 1885 |
| 2,091,618 | Szabo | Aug. 31, 1937 |
| 2,359,369 | Kunkel | Oct. 3, 1944 |
| 2,374,195 | Guarnaschelli | Apr. 24, 1945 |
| 2,659,566 | Rand | Nov. 17, 1953 |
| 2,832,562 | Myers | Apr. 29, 1958 |

FOREIGN PATENTS

| | | |
|---|---|---|
| 180,903 | Great Britain | June 8, 1922 |
| 198,962 | Great Britain | June 14, 1923 |
| 750,181 | Great Britain | June 13, 1956 |